United States Patent

[11] 3,566,000

| [72] | Inventors | Jack R. Maurer<br>Natrona Heights, Pa.;<br>Frank J. Haynes, Chesire; Harrison Stevens, Wallingford, Conn. |
|---|---|---|
| [21] | Appl. No. | 835,050 |
| [22] | Filed | June 20, 1969 |
| [45] | Patented | Feb. 23, 1971 |
| [73] | Assignee | Allegheny Ludlum Steel Corporation<br>Pittsburgh, Pa. |

[54] GROUNDING ROD
11 Claims, 3 Drawing Figs.

[52] U.S. Cl. .................................................. 174/7,
52/727
[51] Int. Cl. .................................................. H01r 3/06
[50] Field of Search .......................................... 174/6, 7;
52/155, 165, 727, 725

[56] References Cited
UNITED STATES PATENTS

| 2,870,242 | 1/1959 | Wilkerson | 174/48X |
| 2,068,545 | 1/1937 | Haig | 174/7 |
| 2,207,134 | 7/1940 | Staples | 174/7 |

FOREIGN PATENTS

| 250,812 | 4/1964 | Australia | 174/7 |

Primary Examiner—Laramie E. Askin
Attorneys—Richard A. Speer, Vincent G. Gioia and Howard R. Berkenstock, Jr.

ABSTRACT: Described herein is a grounding rod and method of using it. The grounding rod comprises a rigidized thin-walled tube of a corrosion-resistant steel and a core of a plastic-type filler within the tube, the core being sufficiently rigid to provide structural support to the thin-walled tube yet resilient enough to allow some bending of the rod to circumvent obstructions encountered in driving the rod into the ground. The plastic filler is a material substantially nonreactive with the tube or the earth environment of the rod's location. The rod is pointed on one end to facilitate driving into the ground and has an anvil on the other end to distribute forces and minimize distortion while the rod is driven into the ground.

PATENTED FEB 23 1971  3,566,000

INVENTORS.
FRANK J. HAYNES,
JACK R. MAURER &
HARRISON STEVENS

By Howard R. Berkenstock, Jr.
Attorney

GROUNDING ROD

BACKGROUND OF THE INVENTION

Grounding rods have been used for many years for the protection of buildings and equipment against electrical discharge, such as lightning and fault currents. A number of designs are currently available, conventionally incorporating a solid-type construction, frequently sheathed with a corrosion resistant material, such as copper. Additional types of grounding rods exist of high strength but lower conductivity. They are constructed of iron pipe and often filled with a material designed to cooperate with the ground waters in the location of the rod to promote the electrical contact of the rod since the iron pipe is itself a relatively poor conductor. There are numerous disadvantages suffered by these conventional grounding rods. Solid rods of highly conductive material are expensive. Quite often high conductivity materials are soft and they buckle readily if they encounter an obstruction while being driven into the ground. The inclusion of holes in a rod as is conventionally done to promote dissolution of filler materials with the earth and electrical conductivity between the electrical conductor and the ground further may weaken the rod and reduce its utility in areas where the earth into which the rod must be driven is fairly hard. Further, as more materials are used to construct a grounding rod, the cost of both manufacture and the labor increases. An additional disadvantage of conventional grounding rods is inflexibility. Often, obstructions are encountered in driving rods into the ground. Conventional rods tend to collapse with further driving and frequently the surplus of the rod above the ground which is unable to be driven further is cut off leaving a ground rod of improper length. The alternative to the foregoing prior to my invention was replacing the restricted rod, causing additional expense for labor and materials. Thus, there still exists a need for a grounding rod exhibiting a high conductivity, strong construction, of low cost material which is easily manufactured, which is substantially noncorrosive in the earth environment and will not collapse when encountering moderate obstructions in the ground.

SUMMARY OF THE INVENTION

This invention relates to an electrical grounding rod and use thereof, characterized by a thin-walled, tubular envelope of corrosion resistant steel having a supporting core of semirigid, resilient material nonreactive with the tube and with the environment in which the rod is placed. Advantageously, the core material is put into compression within the tube. One end of the rod is configured for ease of circumventing obstructions while driving the rod into the earth and the other end includes means to distribute the forces of driving to prevent distortion of the rod. The rod is rigid under the driving forces yet flexible enough to circumvent obstructions encountered in the driving of the rod.

DESCRIPTION OF THE PREFERRED EMBODIMENT

Figure 1:
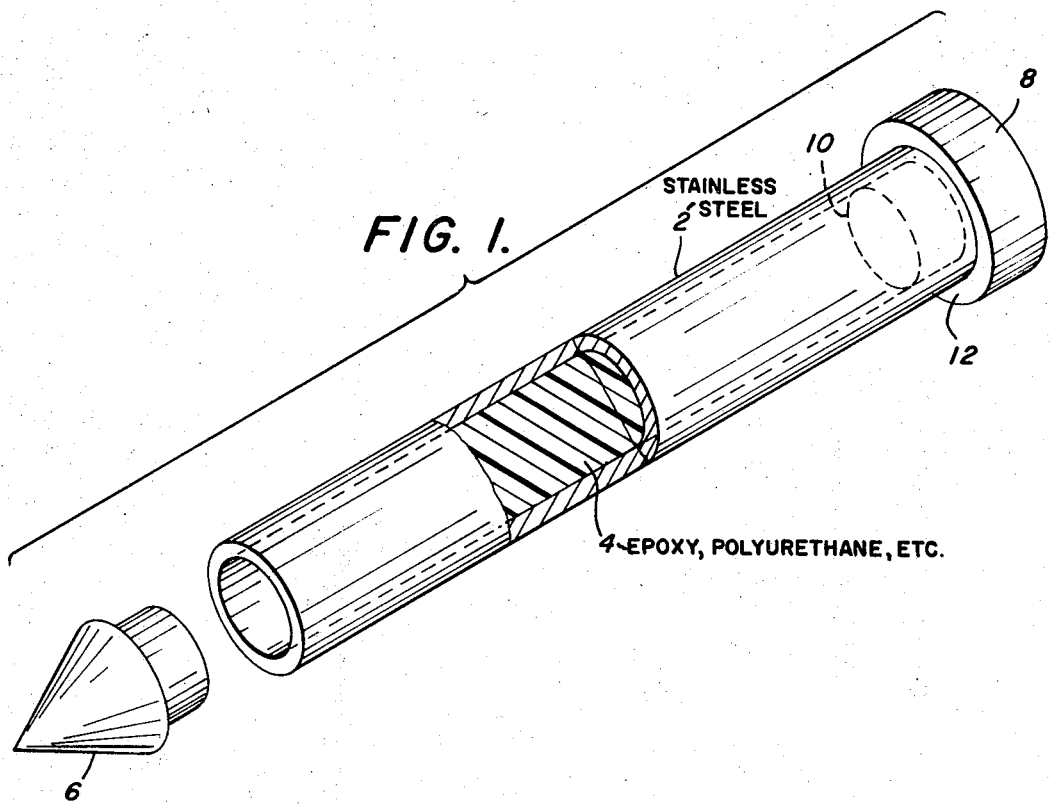
FIG. 1 illustrates, by an exploded view, the grounding rod of the invention.
Figure 2:
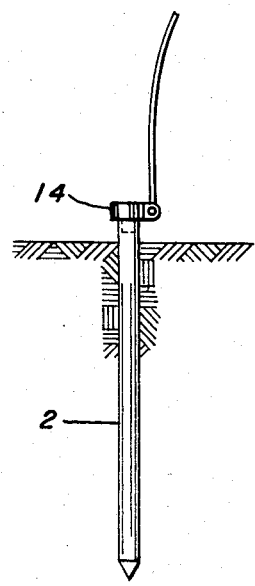
FIG. 2 shows the rod of the invention in its environment.

Referring now to FIGS. 1 and 2, reference numeral 2 indicates a thin-walled tubular envelope of corrosion resistant steel which is electrically conductive. The tube in the figure is cylindrical in shape, however, it may exhibit other cross sections such as polygonal. Tube 2 may be a seamless extruded tube, welded or one which is lockseamed or similarly joined. The diameter and length are generally dependent upon the electrical grounding requirements for the installation. A typical size would be a ⅝-inch diameter tube, 8 feet long.

Though many materials provide adequate conductivity and strength characteristics, in accordance with the invention a corrosion-resistant steel such as a stainless steel (e.g., AISI Type 304) is used. Such a material provides additional strength and nonreactive properties which allow the minimization of expensive conductive materials, yet provide additional characteristics described below. Grounding rods of our invention are constructed with tube walls much thinner than known; i.e., less than 0.07 inches. Typical of the practice of our invention is the use of a stainless steel tube having a wall thickness of as little as 0.035 inches. Such structures contribute substantially to the objectives of reducing materials cost and providing a facility to circumvent obstructions when being driven into the ground. Only corrosion-resistant steels provide the combination of properties and economy which permits construction of a tubular envelope strong enough to be driven into the ground when supported internally by a semirigid, flexible material, yet flexible enough to be able to circumvent moderate obstructions encountered during pounding into the ground.

In the illustration shown in FIG. 1, tube 2 is filled with a supporting core 4 nonreactive with the envelope 2 and the earth environment. Materials known as "plastics" may be advantageously utilized, however the material need not be organic. The necessary characteristics of the core material are:

1. that it be nonreactive with the steel tube and the earth environment;
2. that it provide a sufficiently rigid support when in position within the tube so that the filled tube may be driven into the ground; and
3. that it be slightly resilient so as to allow some bending of the composite rod. If core 4 is in compression within the tube 2, the value of core 4 is enhanced ensuring the tube is supported over its entire inside diameter.

In one embodiment of the grounding rod the conductive tube 2 may be filled with a flowable core material such as an epoxy, a polyurethane or an elastomer which is solidified or hardened within the tube. In order to achieve a core 4 which would be in a condition of compression when solidified within the tube 2, the optimum flowable material would be one which would expand slightly as it solidified. This would eliminate an additional step of placing the core 4 in compression such as by compressing the ends of the core 4, after solidification to achieve this condition.

The grounding rod of the invention may have directing means such as a separate driving point 6 affixed to one end of the tube 2. Such an attachment facilitates driving the rod into the earth with a lesser driving force. It is also possible to point one end of the tubing by reducing its outside diameter progressively toward that end; however, an attachable driving point of a material of high hardness may be more desirable in certain application. It is to be noted that once the rod or tube 2 is driven into the earth, the point has no further function, thus the driving point 6 need not be of a corrosion resistant material. As a preferred alternative to the sharply pointed detachable driving point, illustrated in FIG. 1, the driving point 6 may present a rounded aspect. Such a rounded point encourages the rod to slide slightly to one side or the other in the event an object is encountered below the earth level while driving the rod.

The combination of the strong, thin-walled tube with a semirigid core 4 permits some flexing of the rod further enhancing the ability of the driven rod to pass an obstruction without collapse of the rod. The higher strength of the corrosion resistant steels inhibits splitting, tearing and collapse of the tube while the thin wall allows some flexing without buckling.

The semirigid core supports the tube uniformly throughout the inside diameter of the tube while also flexing to accommodate a path around ground obstructions. More rigid, less resilient cores, such as compressed wood, concrete, etc., and thicker wall construction restrict flexibility of the rod and its ability to circumvent obstructions and thus encourage buckling. More ductile tube materials such as copper provide insufficient wall strength to retard buckling or protect against splitting and tearing of the rod during the driving.

Figure 3:
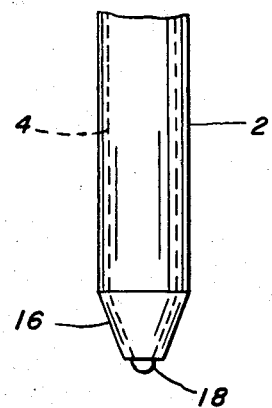
FIG. 3 illustrates a grounding rod of an alternative embodiment.

The preferred embodiment illustrated in FIG. 3 demonstrates an additional embodiment in a rounded point 16 formed such as by swaging the filled tube 2 to a reduced diameter. In so reducing the filled tube, some of the core 4 squeezes out of the end forming a rounded tip 18. The rounded plastic tip further enhances the ability of the rod to move around an obstruction encountered while driving. This is apparently due to the plastic tip 18 being able to slide more easily over and around obstructions.

In an alternate embodiment such as shown in FIG. 3, the grounding rod may be formed by drawing a tube over a pliable rod of a material such as polyethylene. By example, the diameter of the core may be the same outside diameter as the tube to be drawn over it. By drawing the thin-walled tube 2 over the core 4, the core is put into compression which provides the entire composite with rigidity and serves as an additional force to counteract any tendency for the wall to collapse during driving impact. A further embodiment utilizing a pliable rod core 4 such as of polyethylene may be formed by inserting the rod 4 into a slightly larger tube and drawing the filled tube 2 through a die "shrinking" it or reducing it in diameter sufficiently to place the core 4 in compression. This method may be employed advantageously when the tube material is less workable, such as stainless steel tubing. A further alternate method of manufacturing a grounding rod of a thin-walled tube having a nonreactive core may be by extrusion. The core 4 may serve as a mandrel over which the tube 2 would be pushed. It is to be noted that the core would have to be sufficiently rigid to withstand the push of the tube over it. Depending upon the workability of a tube of particular steel and wall thickness, one of the above methods may be a more desirable method of manufacture.

The preferred embodiment includes a driving anvil such as shown at 8, attachable to the other end of the tube 2. The anvil serves as an energy absorption and distribution means during the driving of the rod into the earth to prevent collapse of tube 2. The anvil 8 may be detachable and thus, reusable, since it serves no further function after the rod is driven into the soil. In an advantageous form, the anvil 8 has a projection 10 extending into the tube 2 and contacting the core 4 as shown in FIG. 1. Projection 10 extends into and cooperates with the inside diameter of the tube 2 and engages core 4 to transmit some of the driving force to point 6. Further, anvil 8 exhibits a shoulder 12, which may rest on the end of the tube 2 through which the remainder of the driving force is also transmitted.

The anvil might also take the form of a section of capped pipe having an inside diameter only slightly larger than the outside diameter of tube 2; the capped pipe being placed over the driving end of the rod and the rod sunk into the earth in the conventional manner.

After the tube 2 has been driven into the earth, it is ready to function as a grounding rod with the attachment of the electrical grounding lead to it. This may be accomplished by a clamp 14 attached to the end of the tube 2 after removal of the anvil 8 as shown in FIG. 2. Other means of attaching a conductor to the rod as are known in the art are acceptable.

We claim:

1. An electrical grounding rod for driving into the earth comprising a thin-walled tube of corrosion-resistant steel and a core of resilient material inert with said earth environment substantially coterminus with the inside of said tube, means on said rod for attaching a grounding conductor to said rod, directing means on one end of said rod to facilitate driving said rod and circumventing obstructions in the earth, said core and thin-walled tube being sufficiently rigid to be driven into the ground and sufficiently resilient to circumvent said obstructions.

2. An article according to claim 1 wherein said core is under compression.

3. An article according to claim 2 wherein said core is formed of a material of the group of high molecular weight compounds known as plastics.

4. An article according to claim 1 wherein said tube is stainless steel.

5. An article according to claim 4 including anvil means on the other end of said rod to uniformly distribute forces and minimize distortion is said rod during driving said rod into the earth.

6. An article according to claim 5 wherein said anvil means is detachable from said rod after driving and is reusable on another ground rod.

7. An article according to claim 4 wherein said directing means includes an end on said rod of progressively reduced diameter.

8. An article according to claim 7 wherein said directing means is a separate end having a hardness greater than earth affixed to one end of said rod.

9. An article according to claim 7 wherein said directing means includes a rounded end.

10. An article according to claim 9 wherein said core protrudes from said end to form said rounded end.

11. An article according to claim 4 wherein said core is a flowable plastic of the group of materials expandable and hardenable within said core.